March 12, 1968  D. J. HYDE  3,372,545
HYDRAULIC APPARATUS

Filed Feb. 7, 1966  2 Sheets-Sheet 1

INVENTOR
David J. Hyde
BY
Christensen, Sanborn and
Matthews ATTORNEY

United States Patent Office 3,372,545
Patented Mar. 12, 1968

3,372,545
HYDRAULIC APPARATUS
David J. Hyde, Cheltenham, England, assignor to Dowty Technical Developments Limited, Brockhampton, Cheltenham, England, a British company
Filed Feb. 7, 1966, Ser. No. 525,662
Claims priority, application Great Britain, Feb. 10, 1965, 5,716/65
6 Claims. (Cl. 60—53)

ABSTRACT OF THE DISCLOSURE

A hydrostatic power transmission is disclosed which comprises a pair of relatively movable pump and motor casings having mutually adjacent machined surfaces on the exteriors thereof which are adapted to be abutted in surface-to-surface engagement with one another, fastening means applied between the surfaces and detachably interconnecting the casings with one another, to secure them against relative movement while the transmission is in use, and positive displacement hydraulic pump and motor means mounted within the interiors of the pump and motor casings, respectively, in hydraulic connection with one another to transmit power between the input and output thereof.

---

This invention relates to hydraulic apparatus and more particularly to a hydrostatic power transmission of the kind comprising a positive displacement hydraulic pump in hydraulic connection with a positive displacement hydraulic motor.

In accordance with the present invention a hydrostatic power transmission comprises a pump casing, a positive displacement hydraulic pump mounted in the pump casing, a motor casing, a positive displacement hydraulic motor mounted in the motor casing, the two casings each including a machined surface which surfaces are adapted to fit adjacent to one another, and fastening means such as screw-threaded bolts associated with the surfaces for securing the two casings together with the surfaces adjacent to one another.

Preferably a port opens into each surface from the associated casing, the ports being arranged to connect one to the other when the casings are secured together so that hydraulic liquid has free access between the casings and the casings may form at least in part a reservoir to contain working liquid. The surfaces and the fastening means may be arranged so that the two casings may be secured together in more than one relative position.

The hydraulic connections between the pump and the motor may be formed by pipes secured externally of the casings to the appropriate hydraulic connections on the pump and the motor casings.

The pump and/or the motor may be of variable positive displacement.

The motor may be of the tilted head fixed displacement type and at one relative position at which the casings are secured together the pump and the motor drive shafts may be parallel to one another and extend oppositely from the casings and the rotary cylinder barrel of the motor may be set so that its rotation axis intersects the pump drive shaft axis.

The pump may be of the tilting head variable displacement type and may be arranged so that the plane in which the axis of the rotary cylinder barrel moves to vary displacement passes through the motor drive shaft axis.

Figure 1:
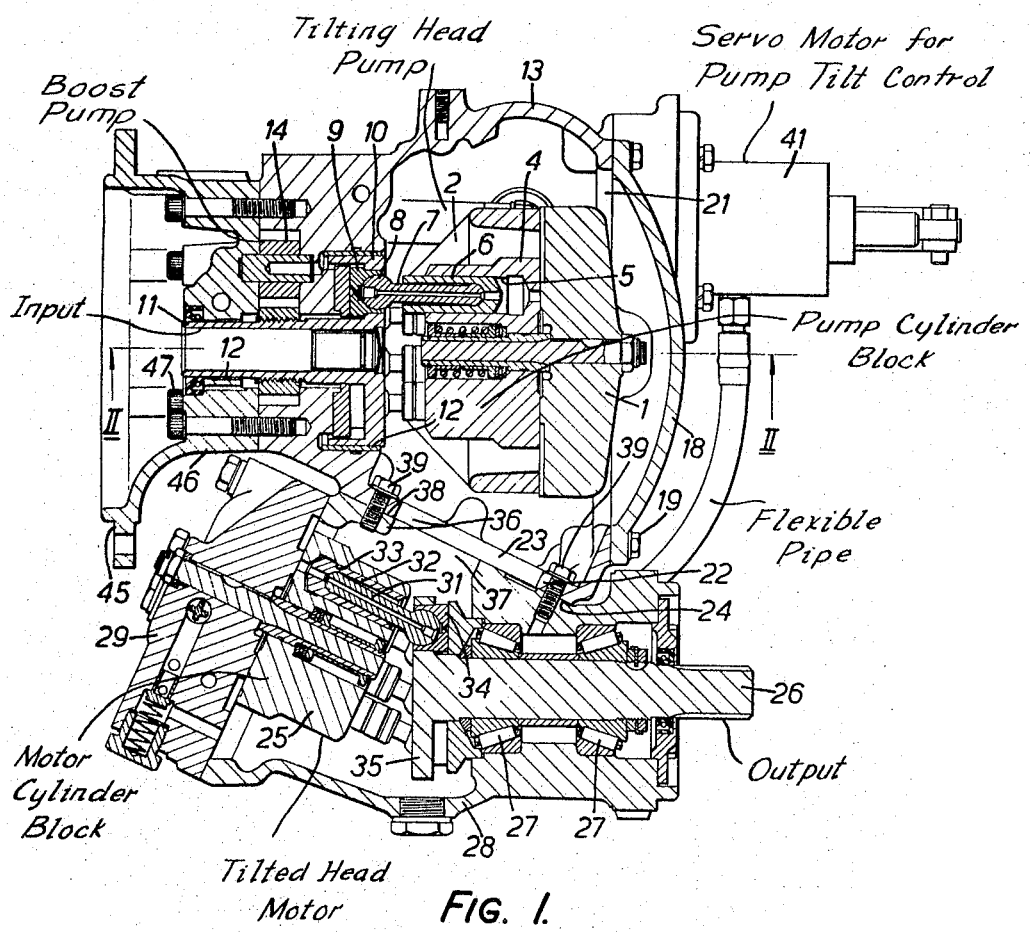
Figure 2:
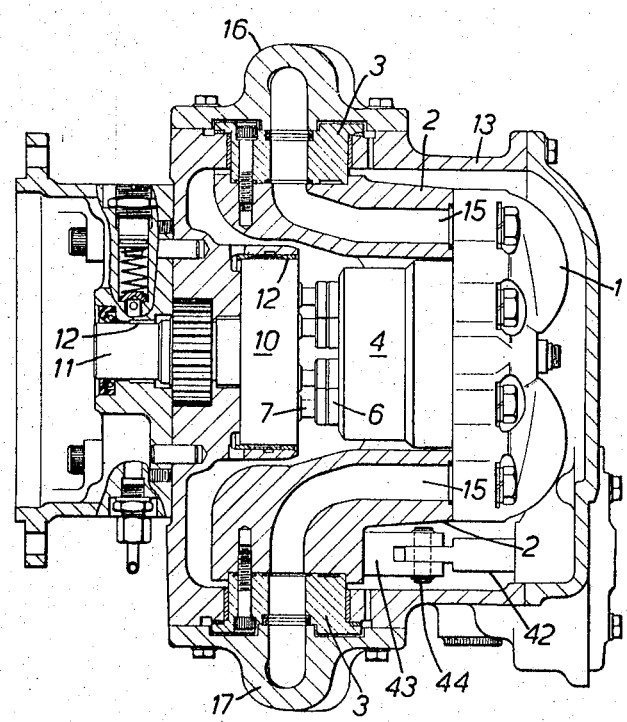

One embodiment of the invention will now be described with reference to the accompanying cross-sectional drawings in which:

FIGURE 1 is a cross-section through the transmission, and
FIGURE 2 is a cross-section through the pump taken on the line II—II of FIGURE 1.

In this embodiment the pump is a tilting head variable positive displacement pump whose construction is similar to the pump disclosed in U.S. Patent No. 3,200,760, granted Aug. 17, 1965. In this construction a valve plate 1 is carried by a pair of side arms 2 from a pair of trunnions 3. A rotary cylinder barrel 4 is carried by the valve plate 1 and includes cylinders 5 equally spaced about its rotation axis and disposed parallel to the rotation axis. From each cylinder a piston 6 extends. From each piston a connecting rod 7 extends terminating in a ball joint 8. Each ball joint 8 is carried within a slipper 9 which in turn is mounted within a drive flange 10. The drive flange 10 is integrally formed with a hollow drive shaft 11 located in bearings 12 within a pump casing 13. The hollow shaft 11 is internally splined for connection to an appropriately splined driving member. The valve plate 1, arms 2 and cylinder block 4 form the pump tilting head which tilts about the axis of trunnions 3 to vary pump displacement. A gear pump 14 driven by the drive shaft 11 is located in a suitable recess within the pump casing 13. Gear pump 14 operates as a boost pump to maintain the transmission primed with liquid.

The pump construction illustrated differs from that shown in the said patent in the fact that each of the side arms 2 includes a hydraulic passage 15 extending from the valve plate 1 to the associated trunnion 3. Within the casing 13 the two trunnions 3 connect to hydraulic supply and return connections 16 and 17 which are accessible from the exterior of the casing 13. For access to the interior of the pump casing 13 a removable cover 18 is provided which may be secured by bolts 19 to a comparatively large opening 21 formed in the pump casing 13.

A thickened flange 22 is formed on the pump casing 13 around an opening or port 23 which is located adjacent to one limit of the swinging movement of the valve plate 1. The exterior of the flange 22 is machined to form a flat surface 24.

The motor is a tilted head unit and differs from the pump only in that the cylinder barrel 25 is mounted for rotation about an axis maintained at a fixed inclination to the rotation axis of the motor drive shaft 26. The motor drive shaft 26 is carried by bearings 27 within a motor casing 28. A removable cover 29 mounted at one end of the motor casing 28 forms the motor valve plate and within the motor casing the cylinder block 25 is mounted for rotation on the valve plate 29. The valve plate 29 also includes conventional valves associated with a hydrostatic transmission such for example as the priming valves, the high pressure relief valve and the unloading valve. Connecting rods 31 extending from pistons 32 in the cylinders 33 of the motor cylinder block 25, engage slippers 34 carried by the motor drive flange 35. The drive flange 35 is integral with the shaft 26. The slippers 34 engage against a wear plate 35 in the manner shown in U.S. Patent 3,286,647, granted Nov. 22, 1966.

The motor casing 25 has a thickened flange 36 surrounding an opening or port 37 communicating with the interior of the motor casing. The flange 36 is formed with a flat machined surface 38. The flanges 22 and 36 are rectangular in shape when viewed in the plane of the surfaces 24 and 38 and are arranged to fit accurately together being secured together by screw-threaded bolts 39.

With the pump and motor casings 13 and 28 secured together as shown with the flat surfaces 24 and 38 in contact with one another the ports 23 and 37 connect directly to one another and the interiors of the two casings are then in direct liquid communication. The interiors of these casings then form part at least of the reservoir of hydraulic liquid associated with the transmission. A servo motor 41 secured to pump casing 13 has a piston rod 42 which extends into the pump casing 13 to engage a link 43 at a pivot 44. The link in turn engages a pivot pin (not shown) secured to an arm 2. The servo motor will thus adjust the angular tilt position of the pump tilting head.

In the described embodiment the pump and motor drive shafts 11 and 26 are parallel to one another and extend oppositely from the combined pump and motor unit. Also in this position it is arranged that the plane through which the rotation axis of the pump cylinder block 4 will move during displacment varying movement will pass through the axis of the motor drive shaft 26 and the axis of the motor cylinder block 25 will pass through the axis of the pump drive shaft 11. This arrangement enables the pump and motor to be compactly fitted together to occupy a minimum of space.

Whilst in the described embodiment the two flat surfaces 24 and 38 are inclined to the pump and motor drive shafts it will be appreciated that this is not necessarily so and any other plane for these surfaces may be selected. In the described embodiment the flanges 22 and 36 are of rectangular shape when viewed in the planes of the surfaces 24 and 38. These flanges may be of any other shape, for example, circular and may be so provided with bolts and bolt holes that the pump and the motor may be secured together at the flanges 21 and 33 in more than one relative position, any such relative position being selected in accordance with the use to which the transmission is to be put. After securing the pump and the motor together at a particular relative position, hydraulic pipes are mounted externally of the casing to extend between the pump connections 16 and 17 and the motor valve plate 29. By means of the hydraulic connections liquid pumped by the pump is delivered to the motor so that mechanical driving power applied to the pump drive shaft 11 is delivered as mechanical power from the motor drive shaft 26 at a speed and torque ratio which depends on the angular setting of the pump tilting head about the axis of the trunnions 3.

An intermediate member may be employed between surfaces 24 and 38 to obtain a desired relative position between pump and motor. Alternatively an intermediate member between surfaces 24 and 38 may be a plate member of sufficient thickness to engage screw threaded bolts from flanges 22 and 36 so that in the screwing of the pump and motor casings together the screw-threaded bolts may be made more accessible.

In the described embodiment the transmission in intended for attachment to an engine by means of a fixing flange forming part of the pump casing 13. This fixing flange is formed as a detachable part 46 of the pump casing which is secured in position by screws 47. When modifying the transmission to fit a particular engine the part 46 only need be specially made to fit the engine, the remainder of the transmission being unmodified.

I claim as my invention:

1. A hydrostatic power transmission comprising a stationary pump casing, a positive displacement hydraulic pump mounted in the pump casing, a stationary motor casing, a positive displacement hydraulic motor mounted in the motor casing, the two casings each including a machined surface which surfaces are adapted to fit adjacent to one another, and fastening means such as screw-threaded bolts associated with the surfaces for securing the two casings together with the surfaces adjacent to one another.

2. A hydrostatic power transmission as claimed in claim 1 including a port opening into each surface from the associated casing, the ports being arranged to connect to one another when the casings are secured together so that hydraulic liquid has free access between the casings.

3. A hydrostatic power transmission as claimed in claim 1 including fastening means which are so arranged that the two casings may be secured together in more than one relative position.

4. A hydrostatic power transmission as claimed in claim 1 wherein the motor is of the tilted head fixed displacement kind and is so mounted in the motor casing that when the latter is secured to the pump casing the motor drive shaft is parallel to the pump drive shaft and the rotary cylinder barrel of the motor is set so that its rotation axis intersects the pump drive shaft axis, the pump being of the tilting head variable displacement kind and so mounted in the pump casing that when the pump casing is secured to the motor casing the plane in which the axis of the rotary pump cylinder barrel moves to vary displacement will pass through the motor drive shaft axis.

5. A hydrostatic power transmission comprising a pair of relatively movable pump and motor casings having mutually adjacent machined surfaces on the exteriors thereof which are adapted to be abutted in surface-to-surface engagement with one another, fastening means applied between the surfaces and detachably interconnecting the casings with one another, to secure them against relative movement while the transmission is in use, and positive displacement hydraulic pump and motor means mounted within the interiors of the pump and motor casings, respectively, in hydraulic interconnection with one another to transmit power between the input and output thereof.

6. The hydrostatic power transmission according to claim 5 wherein the surfaces of the casing are abutted with one another and the fastening means take the form of bolts screw threaded into the casings.

References Cited

UNITED STATES PATENTS

| | | | |
|---|---|---|---|
| 1,993,612 | 3/1935 | Lum | 60—52 XR |
| 2,604,856 | 7/1952 | Henrichsen | 60—53 X |
| 3,040,532 | 6/1962 | Thoma et al. | 60—53 |
| 3,279,173 | 10/1966 | Stolz | 60—53 |

EDGAR W. GEOGHEGAN, *Primary Examiner.*